(12) United States Patent
Mishra et al.

(10) Patent No.: US 9,096,939 B2
(45) Date of Patent: Aug. 4, 2015

(54) ELECTROLYSIS TRANSISTOR

(75) Inventors: Umesh Mishra, Montecito, CA (US); Rakesh Lai, Goleta, CA (US); Likun Shen, Goleta, CA (US); Lee McCarthy, Santa Barbara, CA (US); Primit Parikh, Goleta, CA (US)

(73) Assignee: Transphorm, Inc., Goleta, CA (US)

( * ) Notice: Subject to any disclaimer, the term of this patent is extended or adjusted under 35 U.S.C. 154(b) by 1489 days.

(21) Appl. No.: 12/156,178

(22) Filed: May 29, 2008

(65) Prior Publication Data

US 2008/0296173 A1 Dec. 4, 2008

Related U.S. Application Data

(60) Provisional application No. 60/932,263, filed on May 29, 2007.

(51) Int. Cl.
| | |
|---|---|
| *C25B 9/00* | (2006.01) |
| *C25B 9/04* | (2006.01) |
| *C02F 1/461* | (2006.01) |
| *C25B 1/02* | (2006.01) |
| *C25B 11/00* | (2006.01) |
| *C25B 15/00* | (2006.01) |
| *C25B 11/04* | (2006.01) |
| *C25B 1/00* | (2006.01) |
| *C25B 1/04* | (2006.01) |
| *C25B 1/06* | (2006.01) |

(52) U.S. Cl.
CPC . *C25B 1/02* (2013.01); *C25B 11/00* (2013.01); *C25B 15/00* (2013.01); *C25B 1/003* (2013.01); *C25B 1/04* (2013.01); *C25B 1/06* (2013.01); *C25B 9/04* (2013.01); *C25B 11/0447* (2013.01); *Y02E 60/366* (2013.01)

(58) Field of Classification Search
USPC .......... 205/742, 628; 204/279, 280, 242, 270, 204/276
See application file for complete search history.

(56) References Cited

U.S. PATENT DOCUMENTS

| | | | |
|---|---|---|---|
| 1,379,077 A | 5/1921 | Blumberg, Jr. | |
| 4,031,865 A | 6/1977 | Dufour | 123/1 A |
| 4,107,008 A * | 8/1978 | Horvath | 205/339 |
| 4,111,160 A | 9/1978 | Talenti | 123/1 A |
| 4,424,105 A * | 1/1984 | Hanson | 204/229.1 |
| 4,493,743 A | 1/1985 | Lunding | 156/555 |
| 4,774,810 A | 10/1988 | Bidwell | 60/605.1 |
| 5,105,773 A | 4/1992 | Cunningham et al. | 123/3 |
| 5,144,392 A * | 9/1992 | Brotherton | 257/350 |

(Continued)

OTHER PUBLICATIONS

PCT International Search Report, Dated Oct. 14, 2008.

(Continued)

*Primary Examiner* — Jennifer Wecker
(74) *Attorney, Agent, or Firm* — Koppel, Patrick, Heybl & Philpott

(57) ABSTRACT

An electrolysis transistor for providing high-density electrochemistry and products utilizing the same, and high-efficiency electrolysis and electrochemical processes is disclosed. The electrolysis transistor may comprise an electrolyte, one or more working electrodes for transferring charge to or from said electrolyte, and one or more gate structures for altering electrode over-voltage and modifying the barrier at the electrode-electrolyte interface, reducing the voltage necessary for electrolysis. An electrochemical or photo-electrochemical cell may incorporate one or more of these electrolysis transistors.

19 Claims, 7 Drawing Sheets

(56) References Cited

U.S. PATENT DOCUMENTS

| | | | |
|---|---|---|---|
| 5,231,954 A | 8/1993 | Stowe | 123/3 |
| 5,450,822 A | 9/1995 | Cunningham | 123/3 |
| 5,513,600 A | 5/1996 | Teves | 123/3 |
| 6,209,493 B1 | 4/2001 | Ross | 123/3 |
| 6,355,166 B1 | 3/2002 | Amarasinghe et al. | 210/223 |
| 6,486,489 B2 * | 11/2002 | Watanabe et al. | 257/9 |
| 6,555,945 B1 * | 4/2003 | Baughman et al. | 310/300 |
| 6,756,141 B2 | 6/2004 | Miller et al. | 429/22 |
| 6,817,320 B2 | 11/2004 | Balan et al. | 123/3 |
| 6,896,789 B2 | 5/2005 | Ross | 205/633 |
| 6,984,295 B2 * | 1/2006 | Shiue et al. | 204/230.8 |
| 7,021,249 B1 | 4/2006 | Christison | 123/3 |
| 7,240,641 B2 | 7/2007 | Balan et al. | 123/3 |
| 7,430,991 B2 | 10/2008 | VanHoose et al. | 123/3 |
| 7,981,259 B2 * | 7/2011 | Hafezi et al. | 204/230.7 |
| 8,083,904 B2 * | 12/2011 | Mofakhami | 204/155 |
| 2005/0011765 A1 * | 1/2005 | Omasa | 204/633 |
| 2005/0158704 A1 * | 7/2005 | Tyvoll et al. | 435/4 |
| 2005/0263756 A1 * | 12/2005 | Yatsunami et al. | 257/40 |
| 2006/0079059 A1 * | 4/2006 | Snyder et al. | 438/288 |
| 2006/0121700 A1 * | 6/2006 | Peng et al. | 438/483 |
| 2007/0012264 A1 | 1/2007 | Holt et al. | |
| 2007/0080071 A1 | 4/2007 | Perry, Jr. | |
| 2007/0138463 A1 * | 6/2007 | Herlogsson et al. | 257/40 |
| 2008/0012007 A1 * | 1/2008 | Li et al. | 257/40 |
| 2008/0116080 A1 * | 5/2008 | Lal et al. | 205/334 |
| 2008/0283875 A1 * | 11/2008 | Mukasa et al. | 257/253 |
| 2009/0294303 A1 * | 12/2009 | Fischer et al. | 205/780.5 |

OTHER PUBLICATIONS

PCT Preliminary Report on related PCT application No. PCT/US2008/006823, dated: Dec. 10, 2009.

Search Report related to International Application No. PCT/US2008/006823, Oct. 14, 2008, and Written Opinion of the International Searching Authority, Oct. 14, 2008.

* cited by examiner

FIG. 1
| CELL TYPE<br>PARAMETER | ALKALINE | PEM | ELECTROLYSIS TRANSISTOR |
|---|---|---|---|
| ELECTROLYTE | CAUSTIC: ALKALINE LYE | PERFLUORATED SULFONATED POLYMER | SODIUM SULFATE |
| TEMPERATURE | 70-150°C | 80°C | 25-150°C |
| CURRENT DENSITY | 0.5 A/cm² | 0.1 A/cm² | 10 A/cm² |
| EFFICIENCY | 65% | 65% | > 80% |
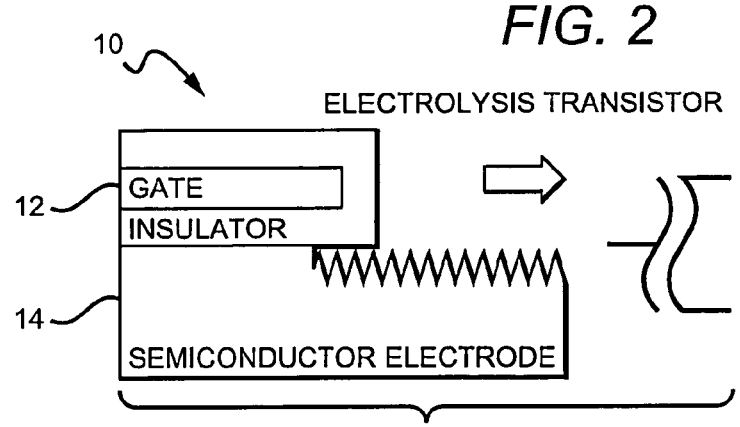
FIG. 2 — ELECTROLYSIS TRANSISTOR
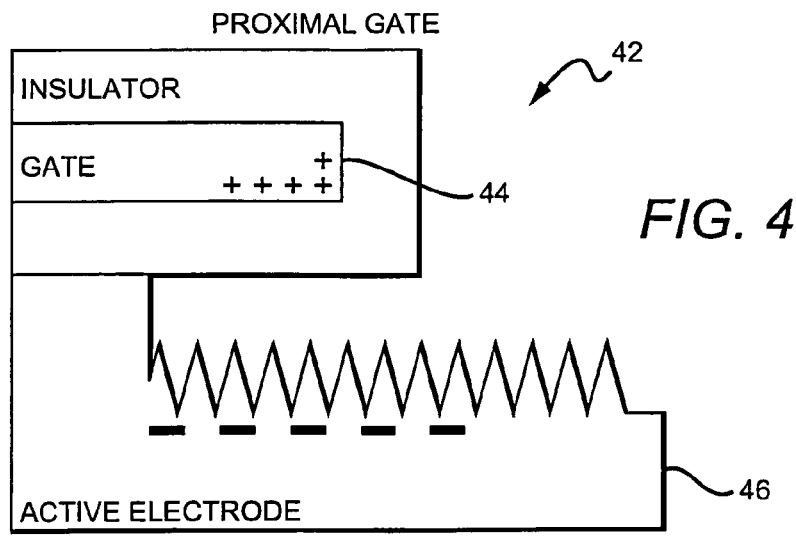
FIG. 4

FIG. 10
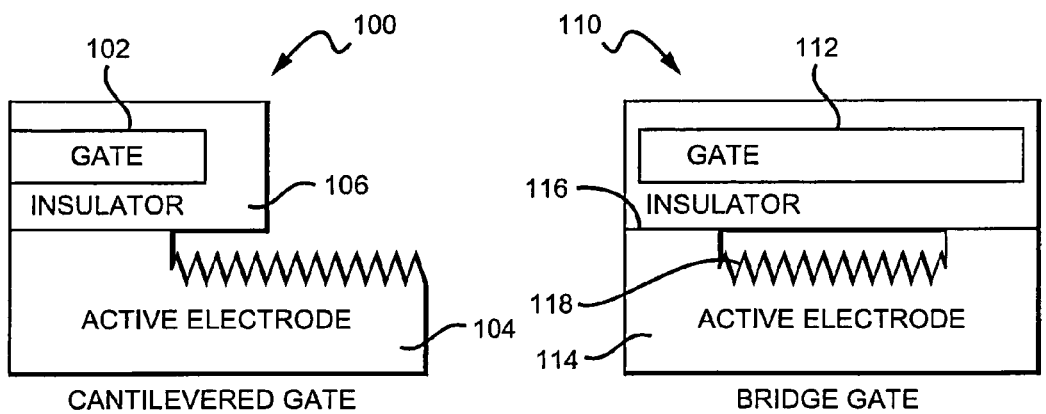
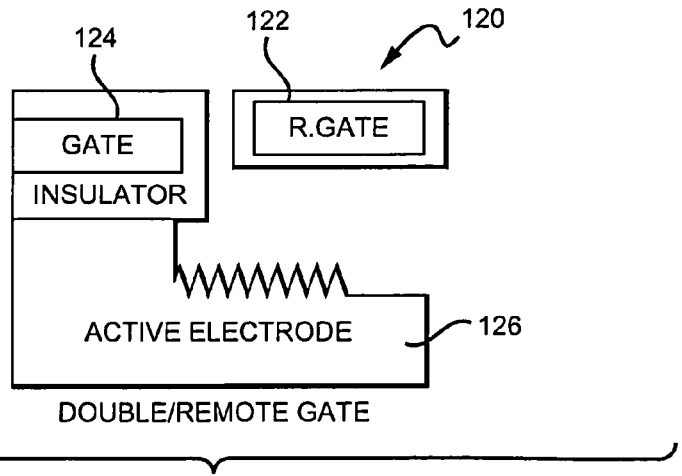
FIG. 12

ELECTROLYSIS TRANSISTOR

This application claims the benefit of provisional application Ser. No. 60/932,263 to Umesh Mishra et al., which was filed on May 29, 2007.

BACKGROUND OF THE INVENTION

Field of the Invention

Although the technology for the electrolysis of water to form hydrogen or oxygen has been developing steadily for decades, a revolutionary advance in efficiency and generation density is required to address near-term, high-purity hydrogen markets and long-term hydrogen economy goals. Currently, over 90% of the hydrogen used worldwide is made by fossil fuel reformation. However, without sequestration the process is not carbon dioxide neutral. Clean, efficient, and compact hydrogen generation can impact national and global economies and the way mankind responds to and manages environmental change. Oxygen generation via electrolysis also has several applications and will likely have more applications if the generation density and energy efficiency are improved.

Current efforts to enhance efficiency and current density rely on improving the electrolyte and electrode. These efforts lead to incremental advances that typically fail to address high-density, high-efficiency electrolysis. While this leads to gradual improvements, a radical departure from this approach is needed to address high-density, high-efficiency applications.

Hydrogen and oxygen can typically be obtained through the electrolysis of water using either: liquid alkaline electrolyzers; proton exchange membrane ("PEM") electrolyzers; or, high temperature steam electrolyzers. Alkaline electrolyzers use extremely caustic KOH solutions to reduce operating voltages. They also operate at lower (although still elevated) temperatures relative to steam electrolysis. However, current densities are still low, and large platinized or nickel coated stainless steel electrodes are required. Additionally, the highly caustic electrolytes severely limit material choices and pose considerable safety and disposal concerns.

PEM-based electrolyzers use advanced polymer membranes in place of alkaline electrolytes. While this enhances the usability of the system, maximum current densities are much lower than that for alkaline electrolyzers. These low current densities lead to systems requiring large quantities of expensive membrane and platinized electrode material, as well as expensive assembly techniques.

High temperature steam electrolysis requires less electrical power than other systems, but requires large amounts of thermal energy to maintain operating temperatures of 1000° C. For high-efficiency operation, these electrolyzers need large, constant heat sources such as nuclear power plants. Steam electrolysis also suffers from low current density and requires steady-state operation. Finding electrode materials that can withstand the aggressive high-temperature oxidizing and reducing environments that are present in steam electrolyzers is a significant challenge.

The table in FIG. 1 compares key performance characteristics for alkaline and PEM-based electrolyzers with those of the electrolysis transistor described in detail below. The parameters indicate that low-current density products, caustic electrolytes (in the case of alkaline electrolyzers), low efficiency rates, and large system footprints are characteristic of alkaline and PEM-based electrolyzers, which present a significant barrier to technological progress and innovation. As shown and as will be discussed in further detail below, the electrolysis transistor offers significant improvements in these areas.

While incremental advances continue to be made in conventional two-terminal technologies, such as new nano-structured electrodes, composite metal-oxide catalysts, increased ionic conductivity membranes, and high-density plastics for caustic containment, none of these approaches bring about dramatic improvements in performance. These barriers have limited the penetration of electrolysis systems in the marketplace.

SUMMARY OF THE INVENTION

The present invention provides systems and methods for electrolysis transistors which allow for, amongst other improvements: high-density electrochemistry and products utilizing the same; high-efficiency electrolysis and electrochemical processes; cost effectiveness; and, overall superior performance compared with other existing electrolyzer technologies. One embodiment comprises an electrolysis transistor with an electrolyte, one or more working electrodes for transferring charge to or from the electrolyte, and one or more gate structures for altering electrode overvoltage and modifying the barrier at the electrode-electrolyte interface, reducing the voltage necessary for electrolysis.

Pursuant to another specific, exemplary embodiment, there is provided a method for increasing the output of electrolysis transistors. An electrolyte, one or more working electrodes, and one or more gate structures are provided. Over-voltages and electrochemical, electrolytic, or electrosynthetic reactions are altered by modifying the electric field and potential in a region between the electrolyte and the electrodes and/or gate structures to create conditions facilitating the transfer of electrons between the electrolyte and the electrodes.

In accordance with yet another specific, exemplary embodiment there is provided an electrochemical cell with an electrolyte and one or more gated electrodes for altering electrode over-voltage and modifying the barrier at the electrode-electrolyte interface, reducing the voltage necessary for electrolysis.

These and other further features and advantages of the invention would be apparent to those skilled in the art from the following detailed description, taken together with the accompanying drawings, in which:

BRIEF DESCRIPTION OF THE DRAWINGS

FIG. 1 is a table comparing a few existing electrolyzer technologies with one embodiment of an electrolysis transistor according to the present invention;

FIG. 2 is a cross-sectional view of one embodiment of an electrolysis transistor according to the present invention and a symbol to represent it;

FIG. 4 is a cross-sectional view of one embodiment of an electrolysis transistor according to the present invention;

FIG. 10 is a table illustrating various characteristics for a variety of gate arrangements according to the present invention;

FIG. 12 is a cross-sectional view of one embodiment of an electrolysis transistor according to the present invention;

DETAILED DESCRIPTION OF THE INVENTION

Figure 3:
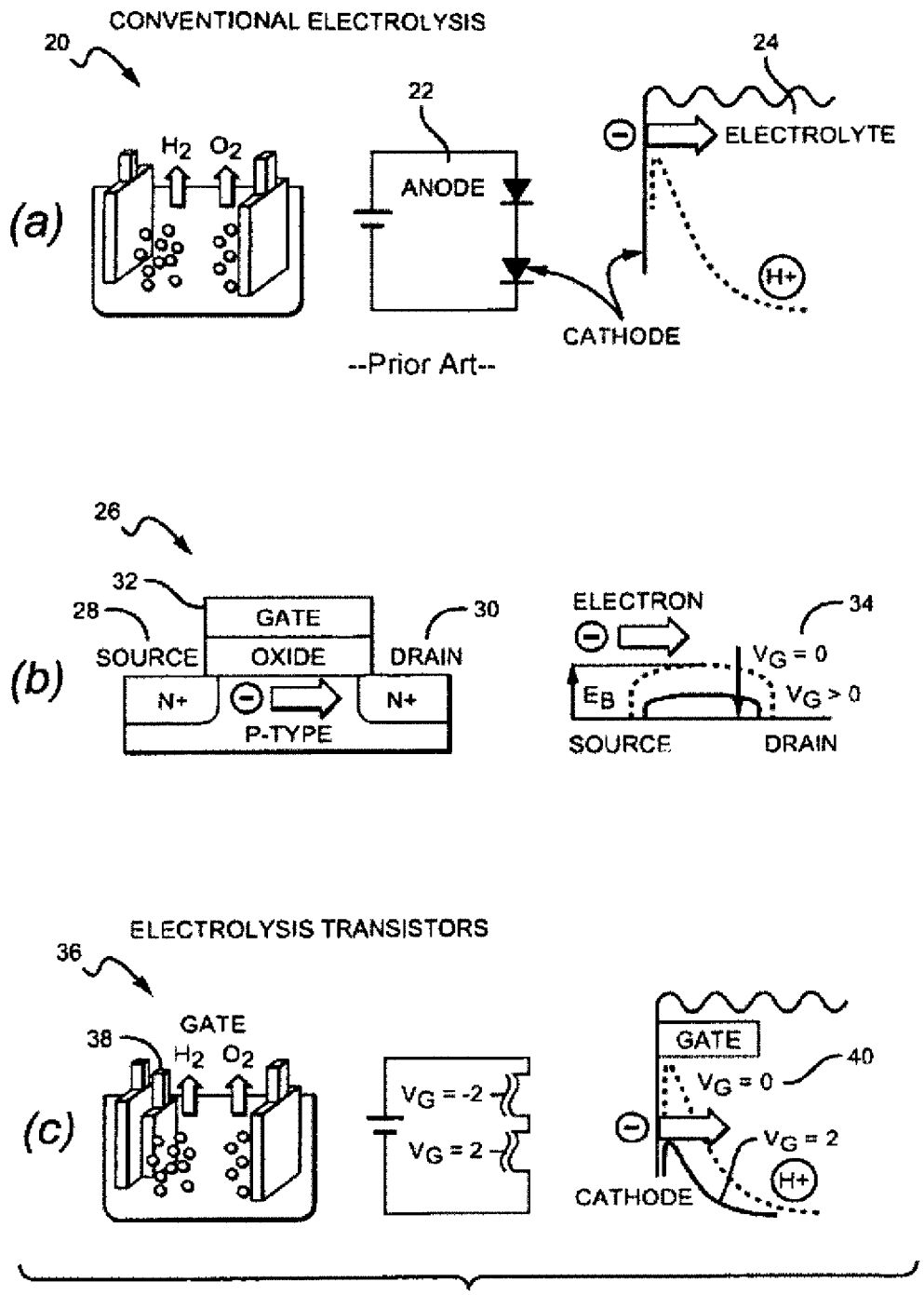
FIG. 3 is a schematic of a conventional 2-electrode cell compared with one embodiment of an electrolysis transistor according to the present invention.

The following description presents preferred embodiments of the invention representing exemplary modes contemplated for practicing the invention. This description is not to be taken in a limiting sense but is made merely for the purpose of describing the general principles of the invention, the scope of which is defined by the appended claims.

Embodiments of the invention are described herein with reference to cross-sectional view illustrations that are schematic illustrations of embodiments of the invention. As such, the actual thickness of the layers can be different, and variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing. A region illustrated or described as square or rectangular will typically have rounded or curved features due to normal manufacturing tolerances. Thus, the regions illustrated in the figures are schematic in nature and their shapes are not intended to illustrate the precise shape of a region of a device and are not intended to limit the scope of the invention.

Photo-electrodes, electrochemical cells, and the like have been utilized as attractive means to obtain hydrogen by electrolysis. The standard potential for splitting water at 25° C. under 1 atmosphere of pressure is 1.23V. However, due to the various over-voltages required, the voltage needed across a cell is greater than the standard potential. For example, at room temperature, the operating cell voltage required for electrolysis of water is over 2V, which is much higher than the thermodynamic standard potential of 1.23V for splitting water. Thus, it is desirable to lower electrode over-voltage to improve the overall efficiency of these systems.

Gated electrode structures have been developed to reduce over-voltages in electrochemical and photo-electrochemical cells by enhancing the field in the electrolyte near the electrode. This type of structure is described in U.S. patent application Ser. No. 11/943,363, entitled "Gated Electrodes for Electrolysis and Electrosynthesis" (hereinafter "the '363 patent"), which is incorporated herein by reference.

FIG. 2 shows one embodiment of an electrolysis transistor 10 utilizing established semiconductor techniques in which the core technical innovations of a proximal gate 12 on a micro-fabricated, nano-structured electrode 14 is provided. The gating electrode modifies the barrier at the electrode-electrolyte interface, reducing the voltage necessary for electrolysis. The result of this transistor is at least a 10× increase in generation density compared to other electrolyzers.

The advantages of this type of gated electrode arrangement and innovations designed to improve performance of this arrangement are discussed in detail herein. It is noted that while the present invention is discussed primarily in terms of hydrogen generation density and efficiency, the disclosures are not to be taken in a limiting sense. The generation density is the rate of hydrogen production (and correspondingly oxygen production) for a given cell area, and has a one-to-one correspondence with the electrical current flowing through the electrodes when cell design prevents parasitic electrochemical reactions. For this reason, the current density, with units of $A/cm^2$, is a good measure of hydrogen generation density. As discussed above, the thermodynamically (LHV) determined voltage required for electrolysis at SATP, 25° C. is 1.23V. Any higher voltage (over-potential) represents loss and therefore a reduction in efficiency. Because efficiency and current density are linked, it is important to consider them together. For example, the efficiency-density product is a good measure of the efficacy of an electrolysis scheme.

In an electrolyzer, there is a barrier to electrolysis at each electrode. FIG. 3(a) provides an illustration for a conventional 2-electrode cell 20, a simplified equivalent circuit 22 with the potential barriers represented by diodes, and a schematic 24 of this potential barrier. These barriers depend on the interface properties of the electrode-electrolyte system, and it is desirable for these barriers to be as low as possible. Conventionally, this has been achieved by optimizing the electrode-electrolyte system.

An analogy for the operation of the electrolysis transistor can be found in the field of semiconductor MOS transistors as illustrated in FIG. 3(b). In a semiconductor MOS transistor device 26, a barrier exists between the source and drain electrodes, 28 and 30 respectively. This barrier is modulated by applying a voltage to the gate electrode 32. As the barrier is lowered and as shown in schematic 34, the channel current increases exponentially for a given source-drain voltage.

An exemplary embodiment of an electrolysis transistor 36 according to the present invention is described herein, and extends this concept to the barrier at the electrode-electrolyte interface, as shown in FIG. 3(c). This allows independent control of the electrolysis barrier, with the gate electrode 38 acting in much the same way as the gate terminal 32 in the MOS transistor 26 described above. This solution can provide an approximate 10× potential increase of hydrogen-generation current density to 10 $A/cm^2$ or more, while maintaining high-efficiency and eliminating caustic electrolytes.

As illustrated in schematic 40, at the cathode, electrons must tunnel through the potential barrier to the hydrogen ion or a hydrogen containing radical for electrolysis to take place, and a similar process is required at the anode where electrons tunnel from a radical/molecule to empty states in the anode. In a two terminal electrolysis cell, the only way the barrier can be reduced and the current increased for these processes is by increasing the cell voltage, which reduces the efficiency of the device.

Figure 5:
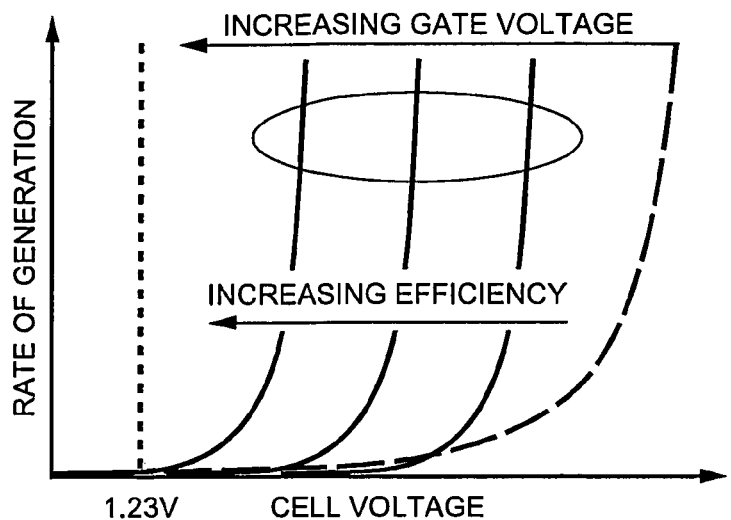
FIG. 5 is a graphical representation of the relationship between barrier lowering and efficiency of an electrolysis transistor according to the present invention.

FIG. 4 shows one embodiment for an electrolysis transistor 42 according to the present invention. A proximal gate 44 near the cathode 46 can lower the barrier to electron transport without requiring a large cell voltage. By applying a positive voltage to the gate, image charges in the cathode create an enhanced field in the electrolyte, thus reducing the barrier and leading to electrolysis and the formation of hydrogen. As shown in FIG. 5, the gate voltage reduces the necessary over-voltage for electrolysis. There is a direct link between lowering the barrier and increased efficiency at a specific current density. Alternatively, there is a direct link between lowering the barrier and an increased current density at a specific efficiency.

To prevent screening of the electrodes, the gate and the dielectric should be brought sufficiently close to the cathode. Semiconductor nanofabrication technology, capable of manufacturing integrated transistors with feature sizes in the 10 s of nm range, can be utilized to fabricate such structures where the gate and dielectric can be brought sufficiently close to the cathode. Alternatively, other processes known in the art for producing nano-structured materials can be used to fabricate the electrodes.

The electrolysis transistor can overcome many key roadblocks plaguing the current state of the art electrolysis, including but not limited to: low current density-efficiency product; exotic electrode materials, caustic electrolytes and/or expensive polymer electrolytes; and, complex, high-cost systems. The electrolysis transistor can also provide the following advantages, which include but are not limited to: a reduction in the module footprint and weight; an increase in generation efficiency; and, a reduction in overall system complexity.

A reduction in the footprint and weight of the device can be achieved through an increase in the generation density of the electrolytic cell, or in other words, an increase in the volume of hydrogen (liters per minute) generated by the cell. Since there is a 1:1 relationship between the rate of hydrogen generated and the current applied to the electrodes, the current density at an electrode in a cell is an appropriate measure for hydrogen generation density as long as the coulombic efficiency is close to one.

Figure 6:
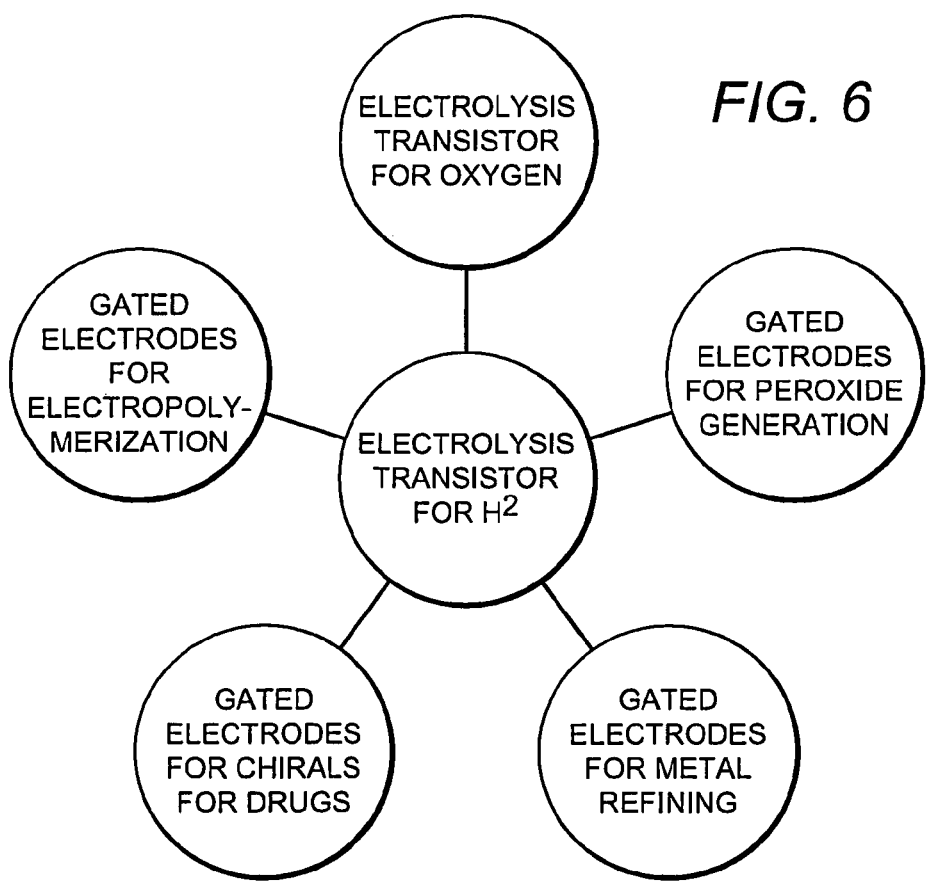
FIG. 6 is an illustration indicating various applications which an electrolysis transistor according to the present invention can benefit.

While the present invention is particularly applicable to the generation of hydrogen and oxygen through the electrolysis of water, it is understood that it may be applied to other applications as well, including the enhancement of current technologies and applications in budding new industries. FIG. 6 illustrates a number of possible applications and/or industries that can benefit from transistors according to the present invention. For example, one application can apply to the production of oxygen, with an oxygen generator that is mobile, compact, and highly efficient. Such an application could revolutionize oxygen therapy. The gating concept may also be applicable to other applications and/or industries, as it is capable of enhancing the efficiency of electrochemical processes such as in the refining of metals, the manufacture of chemicals such as NaOH, and the generation of chlorine for water purification.

The '363 patent for gated electrochemistry focused on electrode-gate structures for facilitating electron transfer across the electrode-electrolyte interface. In the electrolysis transistors described in the present invention, complete cells are described using various electrode bias combinations for the electrolysis of water. These combinations can include, but are not limited by, commingled generation of hydrogen and oxygen and generation of hydrogen and oxygen with in-cell separation of the gases. Systems can also be provided that allow for more relaxed geometries, such that structures for separation are possible.

Figure 7:
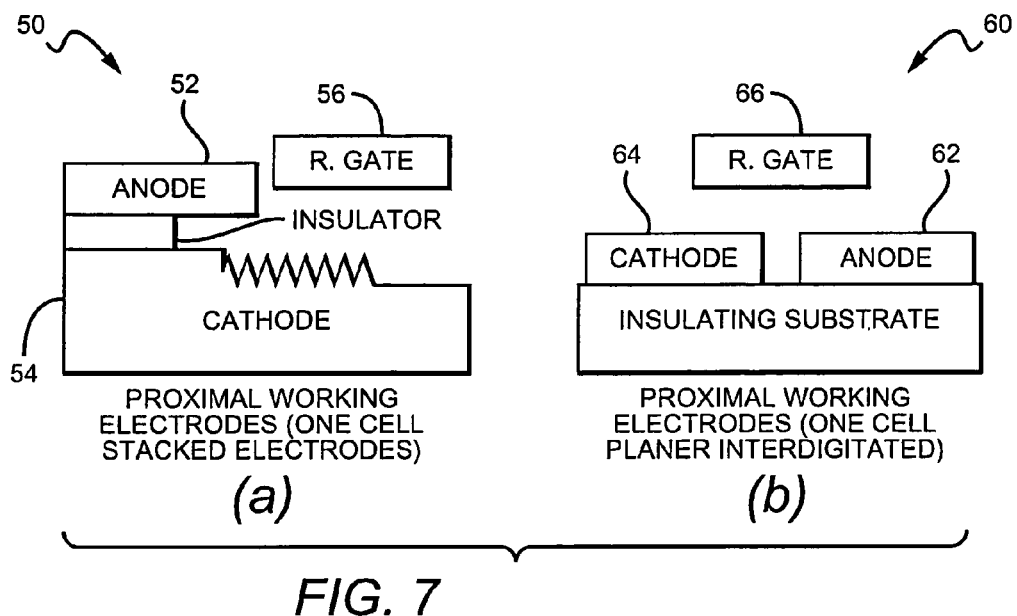
FIG. 7 is a cross-sectional view of one embodiment of an electrolysis transistor according to the present invention.

FIG. 7(a) shows one embodiment of an electrolysis transistor 50 according to the present invention. A full cell manifestation is provided that generates commingled hydrogen and oxygen via a proximal anode 52 and cathode 54 configuration, in which the electrodes are stacked and a remote gate 56 is preferably driven by an alternating current (AC) voltage as described below. However, it is understood that a direct current (DC) and/or an AC/DC voltage may also be used. The electrodes are preferably made with appropriate conducting materials that may comprise metals or semiconductors (including oxide conductors, e.g. oxides of iridium), but it is understood that other materials may also be used.

Figure 9:
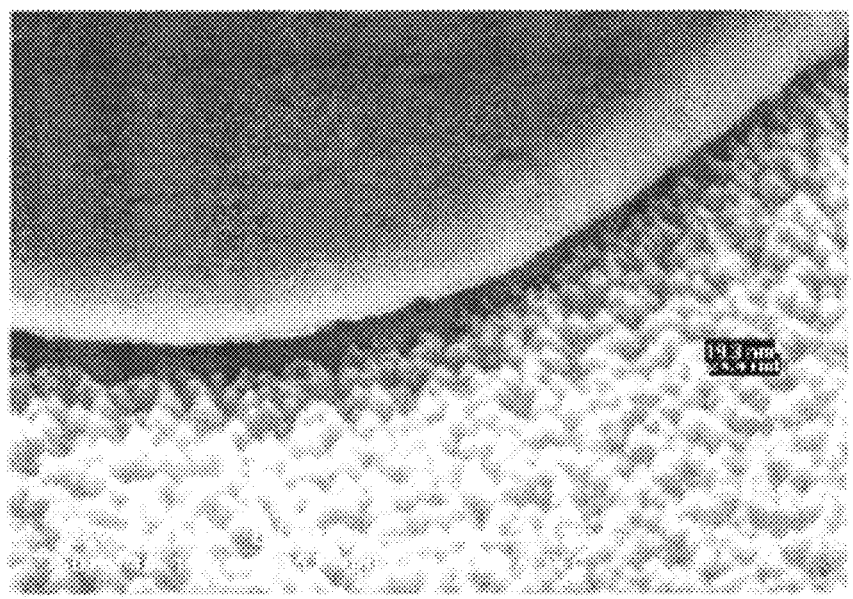
FIG. 9 is a SEM micrograph of one embodiment of a cathode according to the present invention.

In one exemplary realization of the embodiment shown in FIG. 9, the cell configuration comprises a textured GaN cathode, with a PVD deposited Ti/Pt (10 nm Ti with 200 nm Pt) anode on 50 nm of PECVD deposited silicon nitride, and a coil of nickel wire as the remote gate. The electrodes are ~250 µm long, with the platinum anode 3 µm wide and the exposed GaN cathode 2 µm wide, with a 3 micron wide ohmic contact metal contacting it along its length. The unit device comprises 30 pairs of the basic cell, although it is understood that any number of pairs may be included.

In another exemplary embodiment (not shown), iridium and platinum have been used for the anode and cathode, respectively, with the anode being the bottom electrode of the stack. The Ti(10 nm)/Pt(200 nm) cathode is deposited on silicon nitride coated sapphire, and 0.2 µm PECVD deposited silicon nitride separates the Ti(10 nm)/Ir(100 nm) anode from the cathode below. The anode is 5 µm wide and the exposed cathode 2 µm wide. 30 pairs of these 250 µm long electrodes formed a unit device, although it is understood that any number of pairs may be included. While these above embodiments represent a few exemplary realizations of the present invention, they are intended to illustrate a few means for practicing the present invention and are not meant to be taken in a limiting sense.

FIG. 7(b) shows another embodiment of an electrolysis transistor 60 according to the present invention, comprising a proximal anode 62 and cathode 64 formed as a planar, interdigitated electrode pair and a remote gate 66. In one exemplary embodiment, the anode is formed by depositing, partially oxidizing, and annealing iridium with an interfacial titanium layer on a silicon nitride coated sapphire wafer. The cathode is formed from platinum with a titanium interfacial layer on the same substrate. The remote gate is made of nickel. However, it is understood that other materials and other possible combinations of conductors and insulators are possible, with the choices dictated in part by processing constraints, polarization effects and electrode stability.

As discussed above, in the approach generating commingled hydrogen and oxygen in a full cell, the remote gate is preferably driven by an AC voltage. An AC drive is preferable, because in contrast to a semiconductor transistor, an electrolysis transistor is in a conductive solution where the mobile ions move in response to an electric field and thus screen the field. Screening may be undesirable because it can render the gate ineffective. AC gating can reduce undesirable electrode polarization effects.

In addition, when the anode and cathode are proximate to one another, an improvement in current density and efficiency is obtained due to pH change at the counter electrode. For example, when the gate AC drive is in the less positive phase, charge transfer and oxygen evolution occur at the anode. Additionally, $H^+$ is produced. This diffuses to the cathode, when the latter is proximal, and reduces the overvoltage there. A similar process could occur in the more positive half cycle of the gate, when charge transfer and hydrogen evolution occurs at the cathode, with the hydroxyl radical created diffusing to a proximal anode and reducing the over-potential there.

These mechanisms enable improvement in cell performance even when the anode and cathode are not close enough for their space charge layers to interact. The pH swing mechanism with AC remote gating enables one to get improved current density and efficiency without being constrained by the anode-cathode spacing being less than about 50 nm. Good results with interdigitated planar electrodes made with metals have been obtained, with anode-cathode spacing as far apart as 5 µm. However, once electrodes are spaced more than 5 µm apart, the pH coupling between the anode and cathode tends to be lost unless forced convection is used in a cell.

For applications where only hydrogen or oxygen product is desired, post-electrolysis separation of hydrogen and oxygen is required when electrolysis is carried out in a commingled fashion. Many separation techniques can be used, which can include but are not limited by: MEMS or other micro-fabrication based separation schemes for the interdigitated proximal electrode configuration described above. Alternatively, one or more of the gated half-cells described below may be used. The techniques described subsequently seek to modify AC-remote-gate configurations in two significant ways with one goal being separate generation of $H_2$ and $O_2$.

Figure 8:
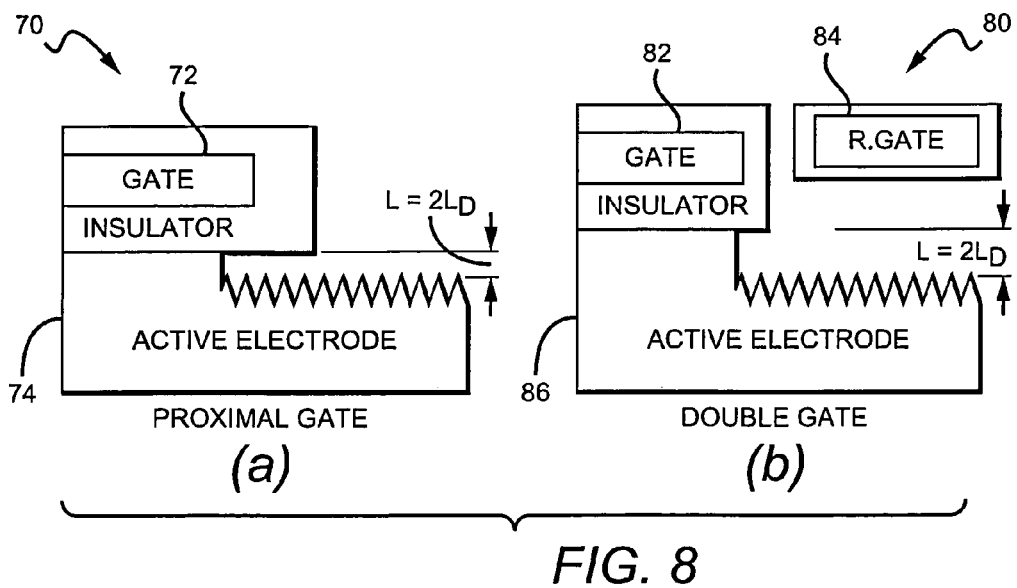
FIG. 8 is a cross-sectional view of one embodiment of an electrolysis transistor according to the present invention.

FIG. 8(a) shows one embodiment of an electrolysis half-cell 70 for electrolysis according to the present invention, which consists of an insulated gate 72 and a nano-textured cathode 74. As best shown in the SEM micrograph of a cathode in FIG. 9, the surface of the cathode is roughened using nano-texturing. As discussed above, voltage applied to the gate electrode results in a high field at the cathode, which is further enhanced by the surface roughening of the cathode. This electric field lowers the barrier to electron injection from the cathode to the $H^+$ ion (or a complex containing the $H^+$ ion) to generate, in sequence, hydrogen atoms (H), hydrogen molecules ($H_2$) and hydrogen gas bubbles. It is understood that a similar structure with appropriate materials could be used for the anode half-cell. Alternatively, a conventional anode could be used.

When a full cell is configured as two half-cells, with each half-cell consisting of a proximal gate and electrode, the insulator choice and coating need optimization. The insulator should be thick enough to prevent current from flowing through the gate terminal. This ensures that the voltage applied to the gate only reduces the barrier at the cathode-electrolyte or the anode-electrolyte interface and does not act as a parasitic anode or cathode. The insulator should also be thin enough and should have a high dielectric constant (high K) to minimize the voltage drop in the insulator and maximize the barrier lowering at the proximal electrode being gated. If the layer is too thin, however, this arrangement can lead to an increase in gate leakage through tunneling (a limit imposed by science) and inadvertent weak areas (a limit imposed by the fabrication of large area micro-electronics). The thickness of the insulator is dependent upon the characteristics of the electrode-insulator combination, so it is understood that any suitable thickness for a given combination is acceptable. However, thicknesses between ~4-10 nm have been effectively utilized.

Not only should the insulator have a small electron affinity/large bandgap to prevent tunneling, it should also be resistant to ionic hopping and transport, especially proton, alkali and hydroxyl ion drift/diffusion. These configurations according to the present invention allow DC operation, which is advantageous in applications where a full cell is configured as two half-cells. DC gating, in the absence of leakage, may consume lesser power than AC gating, which may result in greater system efficiency. However, it is understood that AC and/or AC/DC operation is also possible.

In a purely capacitive circuit, the current is 90° out of phase with the applied voltage (in quadrature) and hence does not contribute to loss. However, this displacement current can flow in the electrolyte and external circuit and leads to losses because of the inevitable resistance of these elements. To measure these losses, the amplitude and phase of the voltage and current to each electrode should be measured. Any loss appears as current and voltage being partially in phase (dissipative) as shown in the schematics of the table in FIG. 10. Power loss in the electrolysis cell occurs when the phase difference between the current and voltage waveforms is less than 90°.

It is therefore desirable that the gate voltage drive be DC while simultaneously eliminating the deleterious effect of screening, although it is understood that AC and/or AC/DC drive are also possible. This can be done if the separation between the gate and the cathode is less than twice the Debye Length (see FIG. 8). The Debye Length, $L_D$, is the distance over which the counter charges that provide the screening are accommodated. As is well known in the art, $L_D$ is inversely proportional to the square-root of the concentration of ions in solution.

The constraint of maximizing the conductivity of the electrolyte to minimize loss requires the concentration of ions to be high. Hence, the Debye Length will be very small, resulting in screening distance in the range of 4-10 nm. This requires separating the insulated gate electrode from the cathode by at most a few 10 s of nm. Advanced microelectronic processing and new nanofabrication techniques, amongst other methods known in the art, make it feasible to achieve this arrangement. The bridge/suspended-gate approach is an extension of the proximal gate concept combined with innovative nanofabrication techniques aimed at increasing active electrode area.

Still another embodiment of an electrolysis transistor 80 according to the present invention comprises a multiple gate scheme. One such embodiment comprises a two-gate arrangement, but it is understood that more than two gates may also be used. In the two-gate approach, the spacing between the proximal gate 82 and the working electrode 86 may be relaxed due to the addition of a remote gate 84 (FIG. 8(b)).

The remote gate 84 may be driven by an AC voltage in the same manner discussed above with a commingled generation embodiment. The proximal gate 82 can be biased using DC and/or AC voltages. The rationale to determine whether to use a combination of the proximal DC bias in addition to the remote AC voltage allows for the amplitude of the AC voltage required for barrier lowering to be reduced. The amount of charging current is directly proportional to the amplitude of the AC drive and so reducing the amplitude while maintaining the magnitude of cathode current and therefore H generation directly enhances efficiency. Relaxing proximal gate-electrode spacing also reduces constraints on materials, processing, yield and reliability.

Many different materials can be used for the cathode, anode, insulators, proximal and remote gates according to exemplary embodiments of the present invention, and these can be arranged in many different ways. For example, the electrodes and gates can be metals, alloys, semiconductors, metals with defected oxide semiconductors on them, or semiconductors with metals or metal oxides on them. Incorporating appropriate materials enables optimization of not only over-potentials arising at the electrode-electrolyte interface, but also electrode-electrolyte capacitance, which is a critical factor for scaling AC gating. Appropriate use of a semiconducting gate could also reduce leakage currents.

A factor that can limit materials choice is the requirement of corrosion resistance in the presence of pH & electrolyte potential swings. Also, the issue of insulators and dielectrics on the gates determines the appropriate materials choice. The remote gate may experience large pseudo-capacitance if a metal is used with a native oxide or a metal oxide that changes the charge state of the metal ions. Also, the gate might be nano-structured or made porous to increase gate electrolyte capacitance. On the proximal gate, the dielectric might be a simply deposited nitride or an anodically grown oxide or designer dielectric with spatially varying thickness, dielectric constant and ionic surface site density.

Figure 11:
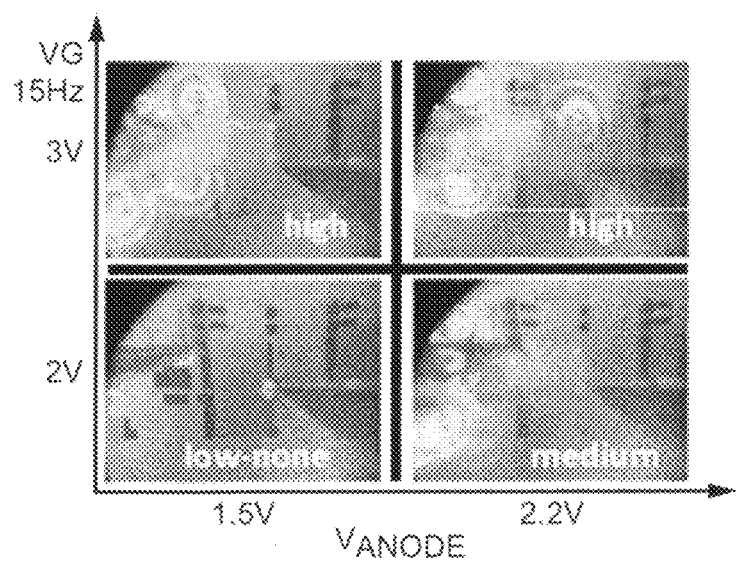
FIG. 11 is a graphical representation of electrolysis with varying anode and gate voltages according to the present invention.

FIG. 11 shows electrolysis with anode and gate voltages varying from 1.5-2.2V, and 2-3V respectively. There is increased bubbling and anode current when the gate voltage is increased. This is akin to higher currents at lower drain-to-source voltages in a MOSFET as a gate voltage is applied that is larger than the threshold voltage of the transistor (FIG. 3b). In one embodiment where sodium sulfate is being used as an electrolyte, the minimum voltage at which electrolysis is observed is 1.5V, which is very close to the theoretical minimum of 1.23V required for electrolysis at SATP. This occurs even though sodium sulfate is being used as an electrolyte for its benign nature rather than for the reduced over-voltages that it presents for electrolysis. In short, the gate enables electrolysis in a non-optimal system by reducing the barrier without dissipating too much power in the gate circuit.

Electrode Structures and Drive Schemes

Figure 13:
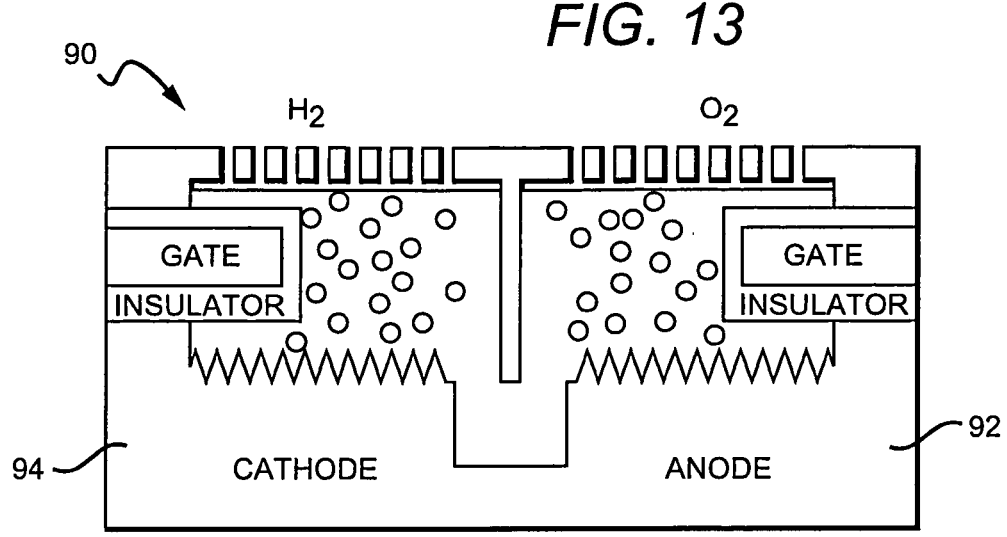
FIG. 13 is a cross-sectional view of one embodiment of an electrolysis transistor according to the present invention.

In one embodiment of the electrolysis transistor according to the present invention, commingled hydrogen and oxygen is generated using nano-structured GaN semiconductor surfaces as a cathode, and proximal Ti/Pt electrodes as anodes. However, it is understood that other suitable materials may also be used. FIG. 13 shows one embodiment of an electrolysis transistor 90 according to the present invention, which is adapted for the generation of separate hydrogen and oxygen. The cell is configured such that the anode 92 and cathode 94 are separated in space so that gases can be collected with minimum cross contamination. This cell configuration can also be adapted for the planar interdigitated electrode with remote gate of FIG. 7(b). The present invention can also utilize various micro-electrochemical switches (MEMS) or other switch topology to prevent commingling of hydrogen and oxygen. In still other embodiments, the hydrogen and oxygen can be separated at the source of generation, preventing comingling. Additional features can be included according to the present invention to enhance performance.

Proximal Insulated Gates

In one embodiment of an electrolysis transistor 100 according to the present invention, proximal insulated gate structures 102 can be fabricated to directly lower the barrier to electrolysis at the cathode 104 surface as shown in FIG. 12. Critical factors for this approach include the thickness of the insulator 106, the proximity of the gate 102 to the active electrode surface (<100 nm) and the surface nano-patterning formed using an anisotropic etch. Another key factor is the ratio of active electrolyzing area to total die area, which directly affects the electrode current density and is a function of finger spacing, electrode undercut, and the range of the gating effect. To adapt the commingled structures for separated hydrogen generation, gating layers can be encapsulated with insulating $SiN_x$, but it is understood that other suitable materials may also be used.

Bridge/Suspended Gate Structure

In one embodiment of an electrolysis transistor 110 according to the present invention, a bridge/suspended gate 112 aims to maximize the active electrode 114 area by suspending the gating electrode over the active electrode 114 using a variant of an air-bridge process. In this case, the gate is deposited on an active electrode substrate 116 and the electrode is simultaneously etched and patterned beneath the gate, resulting in a patterned surface 118 below the suspended gating electrode. The principal advantage of this approach is the increase in active area near the gate. In the proximal gate approach, only the area under the gate is undercut and thus within the lateral active range of the gate to contribute to electrolysis. In the suspended-gate approach, the entire area under the bridge is active, but one needs to optimize the area covered by the gate to allow bubbles formed to escape. This approach is effectively an extension of the proximal gate process for better surface coverage without requiring submicron lithography.

Remote Gate/Double Gate

In one embodiment of an electrolysis transistor 120 according to the present invention, a remote gate 122 structure uses an AC electrical drive to modulate the potential of the electrolyte and reduce the barrier to electrolysis. This remote gate 122 can be used in addition to a proximal gate 124 (to increase the range of the proximal gating effect) or alone as in the case of the commingled generation. This approach is the least complicated from a fabrication point of view. However, it may also be less likely to result in the maximum efficiency and current densities that the proximal gate 102 and bridge gate 112 are predicted to be capable of.

Choice of Electrolyte

The electrode structures should be evaluated for the optimum electrolyte. In one embodiment of the present invention, sodium sulfate is utilized for commingled electrolysis, due to its benign nature, lack of parasitic reactions, and high ionic conductivity. However, it is understood that other suitable electrolytes may also be used. In other embodiments according to the present invention, various other electrolytes can be used, including those used in conventional, liquid-based electrolysis for material compatibility, efficiency, current density, electrode lifetime, environmental concerns, and system compatibility.

Electrode Materials

Optimal materials for active electrodes, gate, and insulator components should also be chosen. In one embodiment according to the present invention $Si_3N_4$ insulators, Ti/Pt anodes, and GaN nano-structured cathodes are utilized. Iridium, with and without specifically formed iridium oxide as the anode, has also been used. However, it is understood that other suitable materials, such as mixed metal oxides, nanoporous or nanostructured metals, may also be used. Moreover, other conducting or insulating materials serving as electrodes and insulators can also be used, which will allow greater flexibility in electrolyte choice and fabrication methods. Some of these possibilities are elaborated below.

Conductive Oxide Anode

While GaN has been an effective cathode, it is unable to withstand the aggressive oxidizing environment of the anode. In one embodiment according to the present invention, Ti/Pt is used as an anode. However, it is understood that other suitable materials may also be used. In other embodiments according to the present invention, conducting oxides such as iridium oxide can be used for the anode. Other oxides, including materials such as ZnO which can be nano-structured to form crystallographic pyramids much like those formed in the GaN system, could also be used. These conducting oxide structures or films are expected to be stable in the harsh oxidizing environment of the anode.

Semiconductor Cathode

As discussed above, in one embodiment according to the present invention, a GaN nano-structured cathode is used. However, other types of suitable cathodes may also be used. Moreover, different patterns can be used that are formed under different patterning conditions. Titanium nitride, with and without a thin layer metal on it, has also been found to be a good cathode material. Different materials and patterns can also be used to improve material conductivity, electrode stability, and lifetime.

Metalized Nano-Structured Si and Other Low-Cost Substrates

While the use of nano-structured GaN has been described above, one alternative material or structure that can be used as a cathode material is metalized nano-structured Si. The cost and substrate sizes are both clear advantages for Si, as well as the advanced Si fabrication and integration capabilities which can be leveraged for use in the electrolysis transistor. Besides silicon, other low cost materials that can be used include, amongst others: steel, aluminum, iron, glass, alumina, plastics, glass epoxy, paper phenolic, etc. In addition, it is understood that other suitable materials can also be used which are similar to those utilized in conventional electrolysis, such as nickel or titanium. All these substrates must be coated with an appropriate electrocatalytic material. These can include, but are not limited to: mixtures of platinum or iridium oxide; iridium-ruthenium oxides; noble metal nanoparticles with metal oxides, including baser metal oxides; and, various combinations thereof. These electrocatalytic materials could be coated directly on a conducting substrate such as metal or highly doped silicon, a base/valve such as titanium, or on an insulating substrate such as glass. Substrate structures that are composites, such as insulators on silicon on which the electrode and gate structures are integrated, may also be provided. Some substrates that are not electrochemically stable, such as aluminum, would require an additional coating of a passivating film.

Metallic Electrodes

In still other embodiments according to the present invention, metallic electrode materials can be used. These metals can also be nano-structured, such as platinum black on platinum, which has been used in conventional electrolysis cells. In alternative embodiments, electrodes can comprise multimetallic or metal with metal oxide composites on valve metal or on other substrates.

Cell Design

Another key component of the present invention is the cell design. Because of the increased current densities, differing materials, and the introduction of the gating electrode, new cells to fully capture the higher hydrogen generation densities need to be implemented. These designs will preferably incorporate several key factors:

Cell Architecture

The electrical drive and connection used in the cell design is dependent on the electrode design described above. Initially, a generic simple cell is used to test parameters such as electrolyte flow, gas collection, manufacturability, and reliability. As the preferred electrode structures for anode and cathode is identified, the cell is adapted to the final electrode configuration. It is understood that the cell design will at least partially be dependent on the embodiment of an electrolysis transistor desired as well as the materials used to comprise such a transistor.

Gas Evolution/Collection

Because of the high gas generation densities, cells require a mix of natural and forced convection to remove the gases generated from the electrode, and gas bubbles may be collected from directly above the electrode arrays, as well as from electrolyte recirculation reservoirs. This can be accomplished by adapting conventional semiconductor packaging technology to liquid processes and gas collection or using other MEMS technologies for constructing appropriate cell fluid structures, including manifolds and reservoirs for gas and electrolyte collection. Important metrics are the maximum density of generation that the collection scheme can accommodate, as well as the degree to which the gas streams can be separated, with acceptably low remote gate-electrode resistance through the electrolyte.

Electrolyte Circulation

Figure 14:
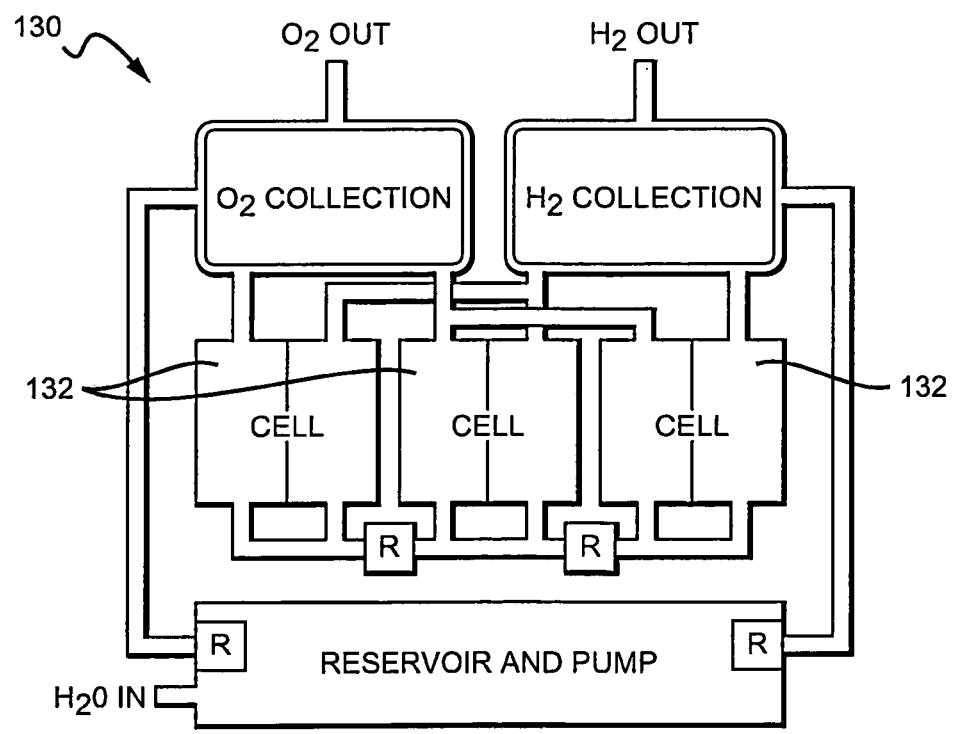
FIG. 14 is a plan view of one embodiment of a fluid management system according to the present invention.

Electrolyte circulation can also be an important requirement based on gas collection efficiency, footprint, and complexity. Forced convection using pumps, such as the system 130 shown in FIG. 14, can be utilized, as well as passive convection schemes. In one preferred embodiment, the electrolyte should contact the maximum available surface area, and the gas may be removed at a sufficient rate. Also, to simplify power supply design, multiple cells (such as cells 132 in FIG. 14) can be connected in series. This requires the electrical current to be blocked from flowing through the electrolyte distribution system for series-connected cells. This can be achieved by increasing the electrical resistance of the electrolyte supply lines, and increasing the velocity of fluid flow through the cell (see FIG. 14).

Pressurized Cells

Pressurized cells can also be designed to reduce system complexity and increase efficiency. To provide sufficient overpressure for gas drying and purification, such as in a palladium purifier for hydrogen, as well as for final output pressure, preferred embodiments could operate at cell pressures of 150 psi or higher. However, it is understood that, depending on the application, other suitable cell pressures may be utilized.

Downstream-Compression

The complexities associated with pressurized electrolytic cells may be mitigated through the development of downstream-compression schemes to bring the hydrogen or oxygen to sufficient pressure for purification as well as end use. If pressurized cell arrangement proves too costly or complex for certain applications, post-compression schemes can be utilized either alone or with pressurized cells. However, an increase in module footprint and a loss in efficiency may result.

Electrical Drive Schemes

One component of the overall cell design will be the arrangement for biasing various electrodes in a steady-state and time-varying fashion. While a preferred scheme uses DC gating with DC anode and cathode voltages, as discussed previously, it may be necessary to incorporate various AC signals as well. Various drive schemes with and without active circuits can be utilized to optimize the electrical drive waveforms with respect to the cell efficiency and generation density. However, these various arrangements can lead to issues of power loss as well as increased power supply requirements and complexity, especially if large capacitive loads must be driven with a gate drive.

A preferred cell design could be powered by either AC or DC, and depending on the embodiment, both AC and DC may be needed, or just DC or just AC. One could have drives with power taken from an AC power outlet, such as from the mains or an automobile alternator, or from a DC source such as a battery, solar, or fuel cell, the last for example for generating oxygen in a portable device. In different embodiments, the cell can comprise an AC-DC conversion circuit/apparatus (if powered from main supplies) or DC to AC conversion circuit/apparatus (if powered by a battery e.g. car, and AC is needed), or both.

Module Design and Integration

The module design and integration segment result in conventional as well as innovative solutions to create a system capable of maximizing the gains in efficiency and size reduction of the electrochemical transistor concept, while leveraging the scalability and integration advantages associated with semiconductor and MEMS fabrication, including low cost fabrication techniques such as screen printing.

Drying and Separation

Typical, preferred applications might require clean, dry gases such as hydrogen for analytical instruments. Like conventional electrolysis techniques, raw output gasses will contain water as well as other electrolyte components. The levels of moisture in the product gasses can be a function of current density from the cells, and a design trade-off can be made between the capability of the drying system and the flow rate from the cells. Options include chemical desiccants and condensers, but is understood that other suitable drying systems may be used. Condenser systems may benefit from MEMs-based high performance heat exchange technology, as well as oxygen pressurized by the electrolyzer, which may be harnessed to supply active Peltier cooling as it is released into the atmosphere. Additionally, although hydrogen and oxygen are preferably collected separately, some amount of oxygen will be collected in the hydrogen stream and vice versa. Conventional catalytic combustors can be used prior to the drying process to controllably remove cross contamination.

Pressure and Flow Control

To produce hydrogen at the desired output pressure (150 psi), the reaction cell can be pressurized. This requires pressurization of the input water, as well as pressure balancing of the hydrogen and oxygen collection processes. Because the electrolysis of water creates double the volume of hydrogen to oxygen, and because demand for hydrogen can vary, the system control module should carefully control the exhaust of oxygen to maintain equal pressure at both sides of the cell.

Power Handling

In a system that requires a lot of power, the power supply will occupy a considerable fraction of the total module footprint. For this reason, power handling can be an important component of the electrolysis module design. Cells can be arranged in a series of arrays such that the voltage drop across this series will be approximately 12 V. In addition to the DC electrolyzer current, the power supply could be required to drive the gate voltage (DC or AC), and any parasitic gate current and/or capacitive load. The projected power dissipation for the electrolysis reaction itself is hundreds of watts to kilowatts per cell module. High current DC power supplies are compact, inexpensive and readily available. If large capacitive loads must be driven at AC, however, the power supply cost, complexity, and size may increase. Resonant mode drive designs can improve efficiency and reduce system complexity.

Safety Systems

Features should also be included in the different embodiments to ensure safe operation, as well as a fail-safe design for hydrogen generators. Primarily passive safety mechanisms are preferably utilized, including minimization of hydrogen storage in gas generation and processing units. Hydrogen gas sensors can also be used to detect leaks in the gas handling system. It is understood, however, that various other suitable safety mechanisms may also be used.

Efficiency

Efficiency of the cell is characterized by measuring all input current and voltage waveforms simultaneously with respect to time. As discussed above, ideally, there is a 1:1 relationship between the conduction current and the electrolysis reaction. However, parasitic electrochemical processes may consume some current without the production of hydrogen. Also, leakage current from the gate to the electrolyte or other electrode can result in energy loss.

Cell Lifetime

The cell lifetime is a key factor in the cost of ownership of the finished module, and can therefore be a critical consideration in the choice of materials and designs. Issues related to the dissolution and/or breakup of electrodes under operating conditions are important in determining materials and processes.

5) Applications

The present invention can be utilized in many different applications, including but not limited to the following: vehicular onboard generation of hydrogen or hydrogen/oxygen mixture for improving fuel efficiency using an electrolysis transistor according to the present invention; integration of hydrogen generating modules into semiconductor equipment (enabled by reduced footprint using the electrolysis transistor); application to electroplating and manufacturing using electrosynthesis and electrolysis; separating oxygen generation for compact oxygen generator used for example, in medical and wellness uses; and, hydrogen generation for use as energy storage medium in portable equipment, hybrid vehicles, intermittent energy sources, and peak shaving.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A device, comprising:
a first electrode and second electrode;
a gate structure coupled to an insulating material layer, wherein said insulating material layer prevents current from flowing from said gate structure, said gate structure electrically coupled to one of said first and second electrodes, wherein said gate structure is overhanging either said first or second electrode; and
a liquid electrolyte disposed between the electrodes and the gate structure, said liquid electrolyte configured to produce hydrogen or oxygen through electrolysis;
wherein the electric coupling is such that an electrical bias applied to said gate structure causes an electrical field formed in the electrolyte to lower an electrical potential barrier to electrolysis of the electrolyte, and a proximity of the gate structure to an active electrode surface of the first or second electrode is less than 100 nm, such that the electrical potential barrier to electrolysis is directly lowered at the electrode surface.

2. The device of claim 1, wherein said lowering of the electrical potential barrier reduces the voltage needed for electrolysis of said electrolyte;
wherein the electrical field formed in said electrolyte is caused by image charges in said first or second electrode induced from an electrical bias applied to said gate structure.

3. The device of claim 1, wherein said insulating material layer comprises silicon nitride.

4. The device of claim 1, wherein said first and second electrodes comprise a cathode and an anode;
wherein said gate structure and said first and second electrodes are disposed on a substrate.

5. The device of claim 1, wherein said first and second electrodes are formed on a substrate formed from a semiconductor material.

6. The device of claim 1, wherein said first and second electrodes are formed on a substrate comprised of conductive or insulating material.

7. The device of claim 1, wherein said first or second electrode comprises a roughened surface which enhances electrical field modification at said first or second electrode.

8. The device of claim 1, wherein at least one of said first and second electrodes is formed from GaN.

9. The device of claim 1, wherein at least one of said first and second electrodes beneath said suspended gate structure is etched to create a patterned surface beneath said gate, said patterned surface increasing the working surface contributing to electrolysis.

10. The device of claim 1, wherein said electrolysis occurs at a current density >1 A/cm2, efficiency of >40% in said electrolyte, and at room temperature and pressure, where said electrolyte is neutral.

11. The device of claim 1, wherein the peak current density is >5 A/cm2.

12. The device of claim 1, wherein said first and second electrodes comprise an anode and a cathode in a stacked configuration.

13. The device of claim 1, wherein the electrolysis of said electrolyte disposed between said electrodes and gate structure causes commingled hydrogen and oxygen to be generated.

14. The device of claim 1, wherein said first and second electrodes comprise an anode and cathode that are separated in space.

15. The device of claim 14, wherein said spacing between said anode and cathode is less than 100 μm.

16. The device of claim 14, wherein said electrolysis causes spatially separated hydrogen and oxygen to be generated.

17. The device of claim 1, wherein one of said first and second electrodes is formed from Ti/Pt.

18. A method for increasing the efficiency of electrolysis of a liquid electrolyte, comprising:
  providing a device having an electrode electrically coupled to a gate structure such that said gate structure is overhanging said electrode, having the electrolyte disposed therebetween, wherein the gate structure is coupled to an insulating material layer, said insulating material layer preventing current from flowing from said gate structure;
  applying an electrical bias to said gate structure to modify an electric field and potential in a region between said electrolyte and said electrode or gate structure to lower an electrical potential barrier to electrolysis of said electrolyte disposed between said electrode and said gate structure; and
  generating spatially separated hydrogen and oxygen from electrolysis of the electrolyte.

19. A method for increasing the efficiency of electrolysis of a liquid electrolyte, comprising:
  providing a device having an electrode electrically coupled to a gate structure such that said gate structure is overhanging said electrode, having the electrolyte disposed therebetween, wherein the gate structure is coupled to an insulating material layer, said insulating material layer preventing current from flowing from said gate structure;
  applying an electrical bias to said gate structure to modify an electric field and potential in a region between said electrolyte and said electrode or gate structure to lower an electrical potential barrier to electrolysis of said electrolyte disposed between said electrode and said gate structure; and
  generating hydrogen from electrolysis of the electrolyte.

* * * * *